(12) United States Patent
Kirrbach et al.

(10) Patent No.: US 11,863,234 B2
(45) Date of Patent: Jan. 2, 2024

(54) WIRELESS OPTICAL COMMUNICATION NETWORK AND APPARATUS FOR WIRELESS OPTICAL COMMUNICATION

(71) Applicant: Fraunhofer-Gesellschaft zur Förderung der angewandten Forschung e.V., Munich (DE)

(72) Inventors: René Kirrbach, Dresden (DE); Alexander Noack, Dresden (DE); Frank Deicke, Dresden (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 212 days.

(21) Appl. No.: 17/537,890

(22) Filed: Nov. 30, 2021

(65) Prior Publication Data
US 2022/0094436 A1    Mar. 24, 2022

Related U.S. Application Data

(63) Continuation of application No. PCT/EP2020/065025, filed on May 29, 2020.

(30) Foreign Application Priority Data

Jun. 3, 2019   (DE) ..................... 10 2019 208 061.8

(51) Int. Cl.
*H04B 10/27*   (2013.01)
*H04L 5/16*   (2006.01)
(Continued)

(52) U.S. Cl.
CPC ................ *H04B 10/27* (2013.01); *H04L 5/16* (2013.01); *H04W 16/28* (2013.01); *H04W 84/005* (2013.01); *H04W 88/08* (2013.01)

(58) Field of Classification Search
CPC .... H04B 10/27; H04B 10/278; H04B 10/803; H04B 10/1149; H04L 5/16; H04W 16/28; H04W 84/005; H04W 88/08
(Continued)

(56) References Cited

U.S. PATENT DOCUMENTS 4,259,584 A    3/1981 Krumme
4,294,682 A    10/1981 Deczky
(Continued)

FOREIGN PATENT DOCUMENTS

AT    515815 A1    12/2015
DE    27 03 591 A1    8/1977
(Continued)

OTHER PUBLICATIONS

International Search Report and International Preliminary Examination Report issued in application No. PCT/EP2020/065025.
(Continued)

*Primary Examiner* — Abbas H Alagheband
(74) *Attorney, Agent, or Firm* — McClure, Qualey & Rodack, LLP

(57) ABSTRACT

A wireless optical communication network includes a base station established for wireless optical communication using a wireless optical signal and including a participant apparatus moveable with respect to the base station including a communication unit established for wireless optical communication. Further, the participant apparatus includes a deflection unit configured to deflect at least part of the wireless optical signal between a first direction between the deflection unit and the communication unit and a second direction between the deflection unit and the base station.

26 Claims, 10 Drawing Sheets

(51) Int. Cl.
*H04W 16/28* (2009.01)
*H04W 84/00* (2009.01)
*H04W 88/08* (2009.01)

(58) Field of Classification Search
USPC .......................................................... 398/41
See application file for complete search history.

(56) References Cited

U.S. PATENT DOCUMENTS

| 2009/0097378 | A1 | 4/2009 | Oder |
| 2010/0202782 | A1* | 8/2010 | Stark .................... G02B 6/3604 |
| | | | 385/39 |
| 2011/0262137 | A1* | 10/2011 | Davidson ............. H04B 10/516 |
| | | | 398/58 |
| 2013/0094927 | A1 | 4/2013 | Ogawa |
| 2018/0166784 | A1* | 6/2018 | Johnson ................... H01Q 3/34 |
| 2020/0275517 | A1* | 8/2020 | Ashrafi ................. H04W 76/22 |

FOREIGN PATENT DOCUMENTS

| DE | 28 46 526 A1 | 5/1980 |
| DE | 10 2006 059 217 A1 | 6/2008 |
| DE | 10 2007 041 927 A1 | 3/2009 |
| DE | 10 2009 018 669 A1 | 2/2011 |
| EP | 1 091 496 A2 | 4/2001 |
| EP | 1 284 429 A1 | 2/2003 |
| EP | 169 797 B1 | 10/2003 |
| EP | 2 903 407 A1 | 8/2015 |
| WO | 00/64076 A2 | 10/2000 |

OTHER PUBLICATIONS

Translation of International Search Report issued in application No. PCT/EP2020/065025.

* cited by examiner

WIRELESS OPTICAL COMMUNICATION NETWORK AND APPARATUS FOR WIRELESS OPTICAL COMMUNICATION

CROSS-REFERENCE TO RELATED APPLICATIONS

This application is a continuation of copending International Application No. PCT/EP2020/065025, filed May 29, 2020, which is incorporated herein by reference in its entirety, and additionally claims priority from German Application No. 102019208061.8, filed Jun. 3, 2019, which is also incorporated herein by reference in its entirety.

The present invention relates to a wireless optical communication network and to an apparatus for wireless optical communication. Further, the present invention relates to a beam splitter based Li-Fi (wireless optical communication) communication system for linear dynamic communication scenarios.

BACKGROUND OF THE INVENTION

The advancing digitalization within industry 4.0 demands reliable data communication between machines. In wireless data transmission, mainly radio-based technologies are used. In particular, the large extent of networking discloses the problems of these radio networks: electromagnetic interference between different communication channels or other interference decreases the reliability. This results in a significant reduction of the coverage or in the extreme case in a complete standstill of data transmission. This problem is particularly significant in trolleys at industrial crane systems. Above that, radio-based technologies are normally not real-time capable, which is, however, obligatory in industrial communication protocols such as Profinet, EtherCat, . . . .

Current wireless transmission systems are based on heavily regulated frequency bands. As radio antennas normally radiate omnidirectionally and radio waves can pass different obstacles or are reflected at the same, there is a superposition of different communication channels in practice. Thus, several systems in the same field of application have to share the available frequency bands. Thus, both the real data rate as well as the possible coverage heavily depend on the environment and therefore limit the reliability of the system. Current RF technologies (RF=radio frequencies) address this problem with complex modulation methods, such as orthogonal frequency divisional multiplex, OFDM. The expensive modulation, demodulation and the long symbol duration, however, results in transmission latency in one and two digit millisecond range, which is not sufficient for the real time requirements of some modern systems.

Communication networks and apparatuses for wireless communication allowing high bandwidth and/or reliable communication despite variable relative position of two communication partners would be desirable.

SUMMARY

According to an embodiment, a wireless optical communication network may have: a base station established for wireless optical communication using a wireless optical signal; a participant apparatus moveable with respect to the base station comprising communication means established for wireless optical communication, further including deflection means configured to deflect at least part of the wireless optical signal between a first direction between the deflection means and the communication means and a second direction between the deflection means and the base station; wherein the second direction runs along an axis of a communication channel, the deflection means is arranged along the axis and the communication means is arranged off-axis.

According to another embodiment, an apparatus may have: communication means established for transferring a wireless optical signal between the apparatus and a communication partner; deflection means configured to deflect at least part of the wireless optical signal with respect to a direction between the deflection means and the communication means.

According to another embodiment, an apparatus for a wireless optical communication network may have: a first wireless optical emitter configured to emit a first wireless optical signal; and a second wireless optical emitter configured to emit a second wireless optical signal.

The inventors have found out that by using wireless optical communication high data transmission rates are possible, which are accompanied by low interference such that reliable communication is possible. Further, the inventors have found that by using deflection means for deflecting at least part of the wireless optical signals of the wireless optical communication, variable relative positions can be implemented such that also communication partners that are moveable with respect to each other can be provided with the advantageous communication.

According to an embodiment, a wireless optical communication network comprises a base station established for wireless optical communication using a wireless optical signal. Further, the wireless optical communication network includes a participant apparatus moveable with respect to the base station comprising communication means established for wireless optical communication. Further, the participant apparatus includes deflection means configured to deflect at least part of the wireless optical signal between a first direction between the deflection means and the communication means and a second direction between the deflection means and the base station. The second direction runs along an axis of an optical communication channel along which the deflection means is arranged, while the communication means is arranged off-axis. Here, it is advantageous that the variable relative position between base station and participant apparatus can be considered by deflecting the wireless optical signal and the advantages of mobile components can be combined with the advantages of wireless optical communication.

According to an embodiment, an apparatus includes communication means established for transferring a wireless optical signal between the apparatus and a communication partner. The apparatus includes deflection means configured to deflect at least part of the wireless optical signal with respect to a direction between the deflection means and the communication means. This allows the usage of the apparatus also in mobile environments.

According to an embodiment, an apparatus that can be used, for example, as a base station for a wireless optical communication network includes a first wireless optical emitter configured to emit a first wireless optical signal; and a second wireless optical emitter configured to emit a second wireless optical signal.

BRIEF DESCRIPTION OF THE DRAWINGS

Embodiments of the present invention will be detailed subsequently referring to the appended drawings, in which.

DETAILED DESCRIPTION OF THE INVENTION

Before embodiments of the present invention will be discussed in more detail below based on the drawings, it should be noted that identical, functionally equal or equal elements, objects and/or structures are provided with the same reference numbers in the different figures, such that the description of these elements illustrated in different embodiments is inter-exchangeable or inter-applicable.

The following embodiments relate to wireless optical signal transmission or data transmission. Within the embodiments described herein, the same is also referred to as Li-Fi (light fidelity). Here, the term Li-Fi relates to the terms IrDA (Infrared Data Association) or OWC (Optical Wireless Communication). This means the terms wireless optical data transmission and Li-Fi are used synonymously. Here, optical data transmission means transmitting an electromagnetic signal through a free transmission medium, such as air or another gas or fluid. For this, for example, wavelengths in the ultraviolet (UV) range with at least 350 nm and the infrared range, for example, at most 1550 nm can be used, wherein other wavelengths that differ from wavelengths used for radio standards are also possible. Wireless optical transmission is also to be distinguished from a wired optical data transmission, which is obtained, for example, by means of optical fibers or optical fiber cables.

Further, embodiments of the present invention relate to a base station and a participant apparatus moveable with respect to the base station. This means a variable relative position between the base station and the participant apparatus, which can be obtained by moving the base station and/or also by moving the participant apparatus, which includes both rotational as well as translational movements and combinations thereof.

Figure 1:
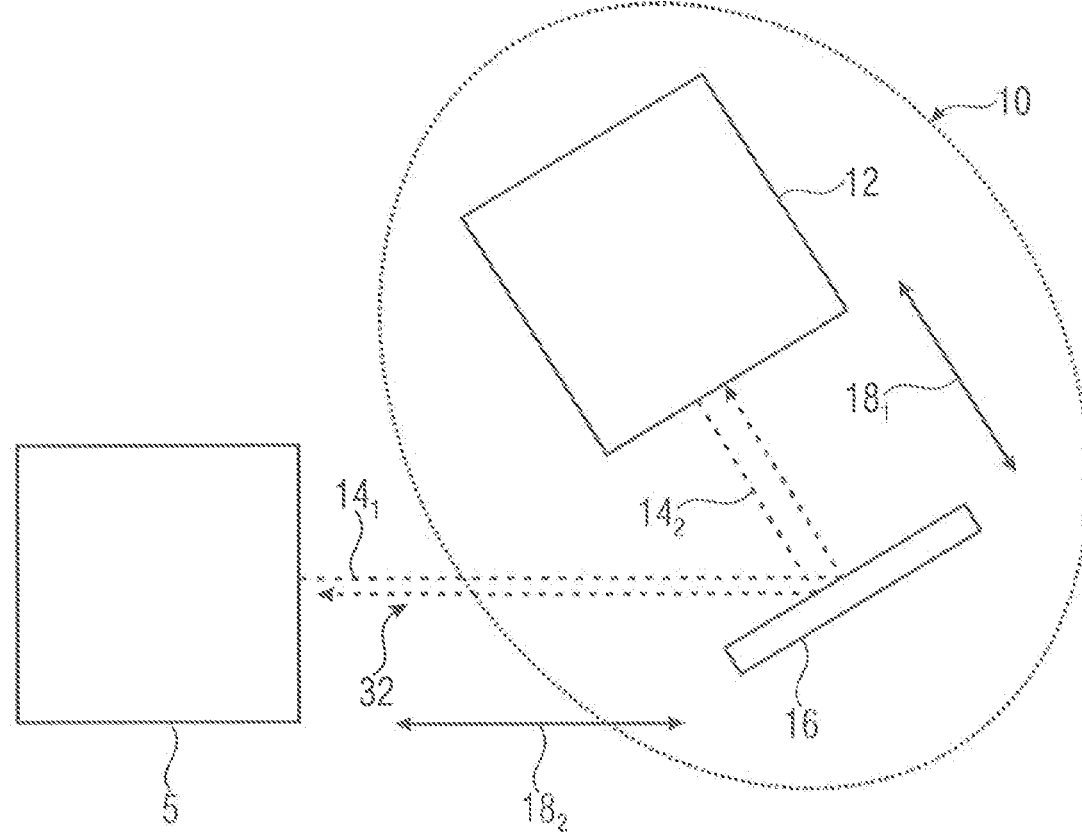
FIG. 1 is a schematic block diagram of a wireless optical communication network according to an embodiment.

FIG. 1 shows a schematic block diagram of a wireless optic communication network 100 according to an embodiment. The wireless optical communication network 100 includes a base station 5 and a participant apparatus 10.

The participant apparatus 10 is movable with respect to, i.e., relative to the base station 5. This means a relative position between the base station 5 and the participant apparatus 10 is variable in that the base station and/or the participant apparatus 10 moves in space in order to change a relative position.

The base station 5 and the participant apparatus 10 are established for wireless optical communication. For this, the participant apparatus 10 comprises communication means 12 established for wireless optical communication. The wireless optical communication includes at least one of a wireless optical signal $14_1$ emitted by the base station 5 and a wireless optical signal $14_2$ emitted by the participant apparatus 10, in particular the communication means 12. Thus, the wireless optical communication network 100 can be configured to transfer the wireless optical signal $14_1$ from the base station 5 to the participant apparatus 10 and/or to transfer the wireless optical signal $14_2$ from the participant apparatus 10 to the base station 5, i.e., to communicate or to transmit the same. The participant apparatus 10 includes deflection means 16 configured to deflect at least part of the wireless optical signal for wireless optical communication, i.e., the wireless optical signal $14_1$ and/or $14_2$ such that the wireless optical signal is deflected between a first direction $18_1$ between the deflection means 16 and the communication means 12 and a second direction $18_2$ between the deflection means 16 and the base station 5.

Here, deflection takes place such that the direction $18_2$ runs along an axis of a spatially established communication channel 32. The communication channel 32 can be described such that the same includes the spatial area illuminated or irradiated by the wireless optical signal $14_1$ or $14_2$, i.e., optical power is included, which serves the communication between base station 5 and participant apparatus 10. The deflection means 16 is arranged along the communication channel 32, i.e., along an axis of the communication channel. The communication means 12 is arranged off the axis or the communication channel 32, i.e., offset or laterally offset to that part of the communication channel 32 running along the direction $18_2$. The offset can be effected by the deflection means 16, such that further participant apparatuses can be placed or arranged in the further course of the (possibly deflected or not deflected) direction $18_2$, wherein it is advantageous to provide a further additional communication channel or to couple out merely part of the optical light power of the wireless optical signal $14_1$ with the deflection means 16. Other advantageous configurations, also with respect to the wireless optical signal $14_2$, are also described herein and can be easily combined.

The deflection of an optical path or course of the wireless optical signal $14_1$ and/or $14_2$ allows a movement of the participant apparatus 10 together with the deflection means 16 along the direction $18_2$ without interrupting the communication between the participant apparatus 10 and the base station 5. Alternatively or additionally, a movement of the communication means 12 relative to the beam deflection means 16 and/or the base station 5 along direction $18_1$ is possible without interrupting such a communication.

Thus, the base station 5 and/or the communication means 12 can have an optical interface for transmitting and/or receiving wireless optical signals. Such interfaces can have an advantageous direction along which transmitting and/or receiving of wireless optical signals is possible with little attenuation. These directions can, for example, completely or partly influence or determine the directions $18_1$ and/or $18_2$.

The deflection means 16 can be formed reflectively such that the wireless optical signal $14_1$ and/or $14_2$ is completely reflected or deflected. Alternatively, it is also possible to configure the deflection means 16 such that part of a wireless optical signal $14_1$ or $14_2$ transmits through the deflection means 16, which allows multiple communication. This is possible irrespective of whether the communication means 12 is configured for transmitting and/or receiving wireless optical signals.

The wireless optical signals $14_1$ and $14_2$ have a certain spatial extension perpendicular to their propagation direction. Here, the same can be emitted in a spatially overlapping manner. Alternatively, it is possible that the wireless optical signals $14_1$ and $14_2$ at least partly differ spatially, i.e., run spatially separated from one another. For this, individual spatially spaced apart beams can be used such that, for example, a channel from the base station 5 to the communication means 12 or the other way round, exemplarily referred to as towards channel, runs spatially separated from a beam of the back channel running in the opposite direction. According to an embodiment, the base station can transmit and/or receive two or several wireless optical signals in different spatially separated beams. This means differing parallel beams can be provided for reception, differing parallel beams can be provided for transmission or a combination thereof can be provided.

According to an embodiment, the deflection means 16 can be stationary with respect to the communication means 12, i.e., the communication means 12 and the deflection means 16 can be moved together. The wireless optical signal $14_1$ and/or $14_2$ can define a spatial optical communication channel along which, for example, the mobile participant apparatus 10 is movable. In particular, this applies to the part of the optical paths along the direction $18_2$, i.e., between the base station and the co-moved deflection means 16.

According to embodiments, which can be implemented as an alternative to deflection means 16 located stationary with respect to the communication means, the communication means 12 is moveable with respect to the deflection means 16, namely along a deflection direction acting on the optical signal $14_1$ or $14_2$ by the deflection means 16, i.e., along the direction $18_1$. With reference to the base station 12, an inclination angle or tilt angle of the deflection means 16 can influence or determine the direction $18_1$ in which the optical signals are deflected, such that the direction $18_1$ can be referred to as deflection direction.

In the context of the embodiments described herein, the base station 5 is arranged stationary in space, wherein one or several participant apparatuses of the wireless optical communication network can be configured to move with respect to the base station.

Figure 2:
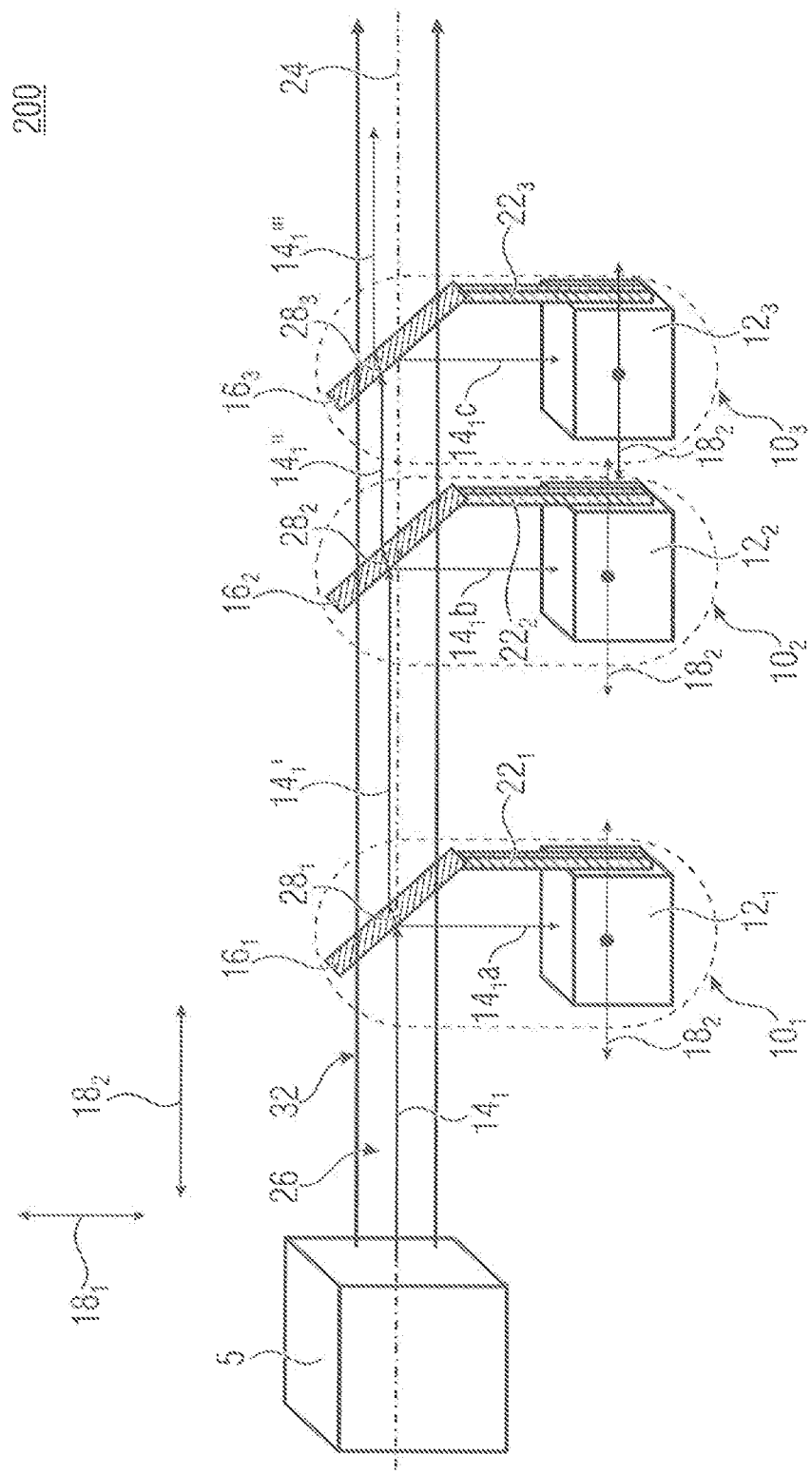
FIG. 2 is a schematic block diagram of a wireless optical communication network according to an embodiment having several participant apparatuses.

FIG. 2 shows a schematic block diagram of a wireless optical communication network 200 according to an embodiment. The wireless optical communication network 200 can comprise one or several participant apparatuses 10. As an example, three participant apparatuses $10_1$, $10_2$ and $10_3$ are illustrated, wherein any other arbitrary number of at least 1, at least 2, at least 3, at least 5 or more, for example, 7, 8 or 10 or more can be implemented.

The deflection means $16_1$, $16_2$ and $16_3$ as well as deflection means of possible further participant apparatuses comprise a line of sight to the base station 5, which is, at most, obstructed by at least partly transparent objects, so that a straight or deflected line of sight is obtained between the participants via which the participants can exchange the optical signals.

Exemplarily, the participant apparatuses 10 are part of a crane system and configured as trolleys movable along the direction $18_2$, i.e., parallel thereto. For example, the deflection means $16_1$, $16_2$ and $16_3$ of the participant apparatuses $10_1$, $10_2$ or $10_3$ are configured as beam splitters, this means a respective portion $14_1$a, $14_1$b or $14_1$c of the wireless optical signal $14_1$ emitted exemplarily by the base station 5 is coupled out when impinging on the respective beam parts $16_1$, $16_2$ or $16_3$, while a remaining portion $14_1'$, $14_1''$ and $14_1'''$ can pass or traverse the respective beam splitter element $16_1$ to $16_3$ in order to form the basis for subsequent coupling-out. Both the portions $14_1$a, $14_1$b and $14_1$c as well as the remaining portions $14_1'$, $14_1''$ and $14_1'''$ can have identical information content.

Each of the deflection means $16_1$, $16_2$ and $16_3$ can be configured to couple out a portion of the optical light power, optionally by considering a partial wavelength range and/or a polarization. As long as the wireless optical communication network provides for the fact that the coupled-out portion of the participation apparatus is not exclusively allocated but also further participant apparatuses are to receive this portion or are to couple out a portion thereof, it can be advantageous that the deflection means 16 is configured such that a portion of at least 0.1% and at most 20%, at least 0.5% and at most 15% and advantageously at least 1% and at most 10% of a light power of a wireless optical signal received by the base station are coupled out. While coupling out less than 1% is possible but technically difficult, coupling out more than 4% can be disadvantageous for a large number of communication participants, as long as energy-saving signal generation is chosen. Depending on the number of participants, an optimum of the coupled-out light power can result at approximately 2% to 4% per beam splitter. The term "received from/from the direction of the base station" relates to both the direct reception of the spatially first participant apparatus $10_1$ as well as to the participant apparatuses $10_2$, $10_3$, . . . behind the same, which receive the transmitted portion.

A participant apparatus closing the communication channel 32 or a participant apparatus arranged spatially last, such as the participant apparatus $10_3$, can also effect non-transparent beam deflection instead of a beam splitter, for example by using a mirror.

The deflection elements $16_1$, $16_2$ and $16_3$ can be arranged stationary via holding elements $22_1$ or $22_2$ or $22_3$ of the respective participant apparatus $10_1$, $10_2$ or $10_3$ with respect to the communication means $12_1$, $12_2$ or $12_3$.

The communication signal $14_1$ can be emitted from the base station 5, for example in parallel to an axis 24, which can also be expressed such that a beam 26 of the wireless optical signal $14_1$ can have a center beam running along the axis 24. This includes both divergent, focused and collimated beams of the base station 5, wherein the explanations also apply to the optical signal $14_2$ and its parts.

It is possible but not needed that the wireless optical signal $14_1$ as well as its remaining portions $14_1'$, $14_2''$ and $14_1'''$ are spatially parallel to one another and/or without any offset to one another. In that way, it is possible that the deflection elements or beam splitter elements effect a respective offset $28_1$, $28_2$ or $28_3$ by refractions or deflections at the respective interfaces of which the deflection means $16_1$, $16_2$ and $16_3$ have two, for example.

The respective offset $28_1$, $28_2$ and/or $28_3$ can also take place by a respectively large configuration of a spatial communication channel 32, which can be influenced, for example, by the fact in what spatial area perpendicular to the axis 24 the deflection means $16_1$, $16_2$ and $16_3$ together or each allow a deflection of the wireless optical signal or a remaining portion thereof.

Further, embodiments provide for a compensation of an offset by rotating, for example, a subsequent participant apparatus, such as the participant apparatus $10_2$, by 180° around the directional axis $18_2$ with respect to the participant apparatus $10_1$, such that an offset $28_2$ having an effect on the participant apparatus $10_2$ can have an opposite effect on the offset $28_1$, which all in all can allow at least partial compensation.

With reference to the wireless optical signal $14_1$, the participant apparatuses $10_1$, $10_2$ and $10_3$ can be connected in series, wherein each of the participant apparatuses $10_1$, $10_2$ and $10_3$ can be referred to as belonging to a plurality or group of participant apparatuses, which can also be expressed such that the plurality of participant apparatuses includes the respective participant apparatus.

As illustrated in FIG. 2, the base station 5 can emit the wireless optical signal $14_1$ as transmit signal, which means the same can act as transmitting means. Each of the participant apparatuses $10_1$, $10_2$ and $10_3$ can be configured to receive at least part of the transmit signal $14_1$ emitted by the base station. This takes place in an optically passive way, this means that by optical coupling-out, transmitting the signal again by one or several or all of the participant apparatuses 10, which means receiving a signal, amplifying the same, possibly evaluating the same and actively transmitting the same again can be dispensed with. Thereby, simple participant apparatuses having low electric power consumption can be implemented.

In other words, FIG. 2 shows a beam splitter based Li-Fi system in a linear communication scenario, such as in a unidirectional communication scenario. Here, FIG. 2 represents a simple realization of the linear communication scenario based on Li-Fi and beam splitters. Electromagnetic radiation, for example, of the ultraviolet, visible or infrared range, can be used as communication wavelength. In the context of embodiments described herein, this radiation is described as light and includes at least the stated wavelength ranges or parts thereof. The system can allow both unidirectional as well as bidirectional data transmission. In the illustrated unidirectional data transmission, one or several, basically any number of participant apparatuses/trolleys can move along the axis 24. The trolleys have, for example, a single spatial degree of freedom with respect to their movement: The same can move forward and backward on the axis 24, which means along the direction $18_2$. Thus, the scenario can be referred to as linear communication scenario. At any point in time, the trolleys 10 are arbitrarily distributed along the axis 24, i.e., their distance to one another and to the base station 5 can be arbitrary. The order of the arrangement of the trolleys 10 along the axis 24 can also be arbitrary but can also be fixed.

The communication channel 32 can be formed along the axis 24. A spatial area along the axis 24, where the data transfer takes place or is enabled, can be considered as communication channel. In unidirectional operation, the communication channel can be completely filled by a light beam, in bidirectional operation, the communication channel can be combined of one or several respective beams from forward and backward path. The light beam can be characterized by a certain divergence, wherein the divergence can also be zero. A beam diameter can be established on the transmitter side of the wireless optical signal $14_1$ and/or $14_2$ of FIG. 1, in a range of at least 1 mm and at most 250 mm, of at least 5 mm and at most 100 mm, or of at least 10 mm and at most 50 mm, wherein the term diameter does not limit the beam shape on round configurations but also includes other shapes such as polygons, ellipses or free forms. The beam divergence can be configured such that a motion tolerance or adjustment tolerance is possibly compensated and still sufficient optical power reaches the receiver. For example, the divergence can be less than or equal to 3°, less than or equal to 1° or less than or equal to 0.1°, which describes an expansion of the optical path across a beam length.

In FIG. 2, the light beam is exemplarily emitted by the base station 5. The communication channel 32 can be configured without fixed spatial limitation. Optionally, the same can be limited by intransparent structures, for example a wall. Each of the participant apparatuses $10_1$ to $10_3$ can communicate with the base station 5 via this communication channel 32. For this, each trolley has, for example, a beam splitter $16_1$, $16_2$ or $16_3$ reaching into the communication channel 32. The beam splitter couples light out of the communication channel to receive the signal or can couple light to transmit a signal. Coupling out can, for example, be performed in the plane perpendicular to the axis 24 as illustrated in FIG. 2. However, the same can be in any other plane. As the beam splitter 16 is mounted on the trolley 10 via one or several holders 22, the same moves together with the same along the axis 24. The beam splitter 16 can have any division ratio, this means any ratio of the power that is coupled out. For a larger number of trolleys, for example, a number of more than five participant apparatuses, it can be useful that significantly more light is transmitted than is coupled out such that each of the trolleys can receive a significantly large portion of optical signal power in order to be able to detect the signal without error.

While FIG. 2 is illustrated such that the participant apparatuses $10_1$, $10_2$ and $10_3$ can move linearly along a straight axis 24, it is alternatively or additionally also possible that the participant apparatuses $10_1$, $10_2$ and/or $10_3$ can move along one or several alternative or additional directions in space. For this, for example, the base station 5 may emit the signal $14_1$ not only along a single straight light beam but, for example, as continuous or discrete light fan and/or in a circumventing manner, such as a circular segment or circle, such that any, for example one-dimensional or two-dimensional movement within the light fan is possible, for example also by deflecting at least one of the fan-like emitted discrete light beams by the deflection means to prevent interruption of the communication or to tolerate interruption of the communication for a certain time.

Figure 3A:
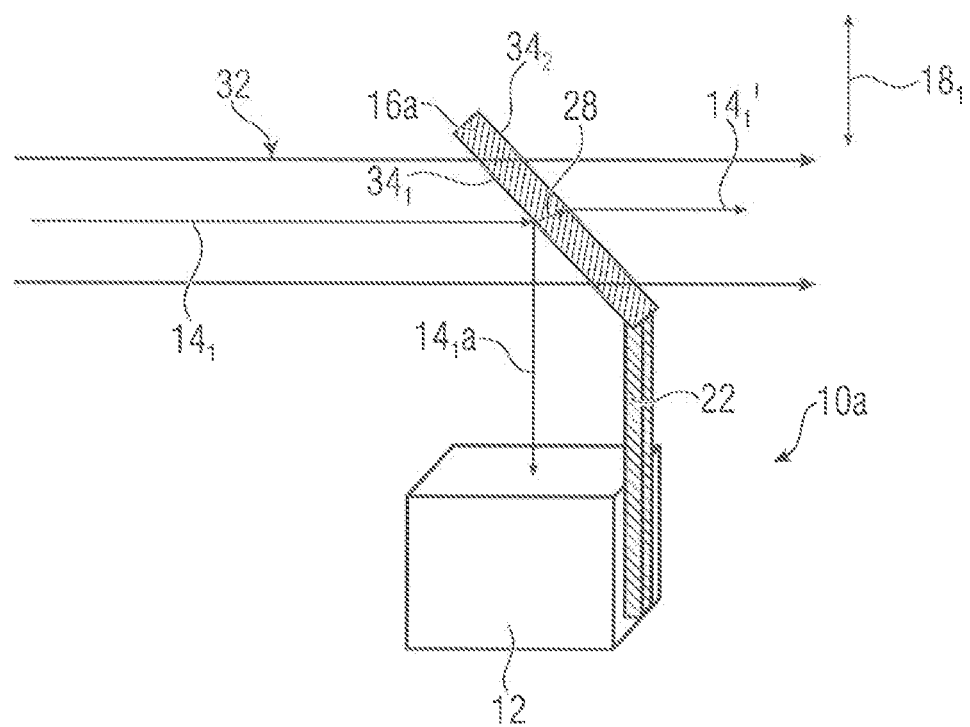
FIGS. 3a-c are schematic views of possible implementations of deflection means of a participant apparatus according to embodiments.

Based on FIGS. 3a, 3b and 3c, possible types of implementation of the deflection means 16 will be described exemplarily. FIG. 3a shows a participant apparatus 10a in a schematic perspective view. Here, the participant apparatus 10a corresponds exemplarily to the configuration of the participant apparatus according to FIG. 2.

The deflection means 16a can comprise a beam splitter including, for example, a beam splitter plate element. Two oppositely arranged main sides $34_1$ and $34_2$ can be configured such that one or both of the main sides result in Fresnel reflections. The deflection means can, for example, be formed in a transparent manner apart from the possibly important Fresnel reflections. This means that part of the light is transmitted and part is reflected between the material of the deflection means 16a and the surrounding medium due to the refractive index difference. Here, the reflected portion is the signal portion $14_1a$ coupled out to the communication means 12 or the signal portion $14_1$ reflected to the base station. The reflectance can be specifically adjusted by the polarization direction of light, as the Fresnel reflections are different for perpendicular/parallel polarized light. Above that, one or both main sides $34_1$ or $34_2$ can have a reflective coating or anti-reflective coating. With such a coating, it is possible to adjust the beam splitter ratio across a large area to couple out, for example, only 1% or a different amount of the light power to be adjusted or even more than 20%. Further, the reflected part depends on the angle of incidence of the signal $14_1$ or $14_1a$ on the deflection element 16a. If, for example, the beam splitter is not arranged at a 45° angle with respect to the impinging signal, for example $14_1$, but at a higher angle, e.g., 60°, 70°, 80°, the reflective portion of the light can be increased. The angle also influences how strongly perpendicular/parallel polarized light is reflected or transmitted. This means that the portion of the reflected light can also be adjusted via the angle of incidence in connection with a defined polarization of the light. In the latter case, an additional coating could be omitted, for example.

Embodiments provide that a tilt angle of the deflection means is in a range of at least 10° and at most 80°, of at least 20° and at most 70°, or of at least 40° and at most 50°, for example, 45°.

For example, for normal glass, the reflectance is approximately 4% (i.e. 96% of the light is transmitted). By an anti-reflective coating, the reflectance can be lowered to a lower value, such as 1.4%. Here, for example, magnesium fluoride (MgF2) is used.

Irrespective thereof, other light-influencing characteristics can still be implemented, such as surfaces for filtering individual spectral ranges (for example, dichroic mirrors), curved surfaces for collimating or scattering.

The beam splitter of the deflection means 16a can effect the mentioned offset 28 along the direction $18_1$ by performing refraction on main sides or main surfaces $34_1$ and $34_2$ that are arranged opposite to one another. An extent of the offset 28 can at least be influenced by a dimension or thickness of the beam splitter element. This can have the effect that the position of the center beam of the beam changes within the communication channel 32 in each coupling-out by a deflection means 16a.

Figure 3B:
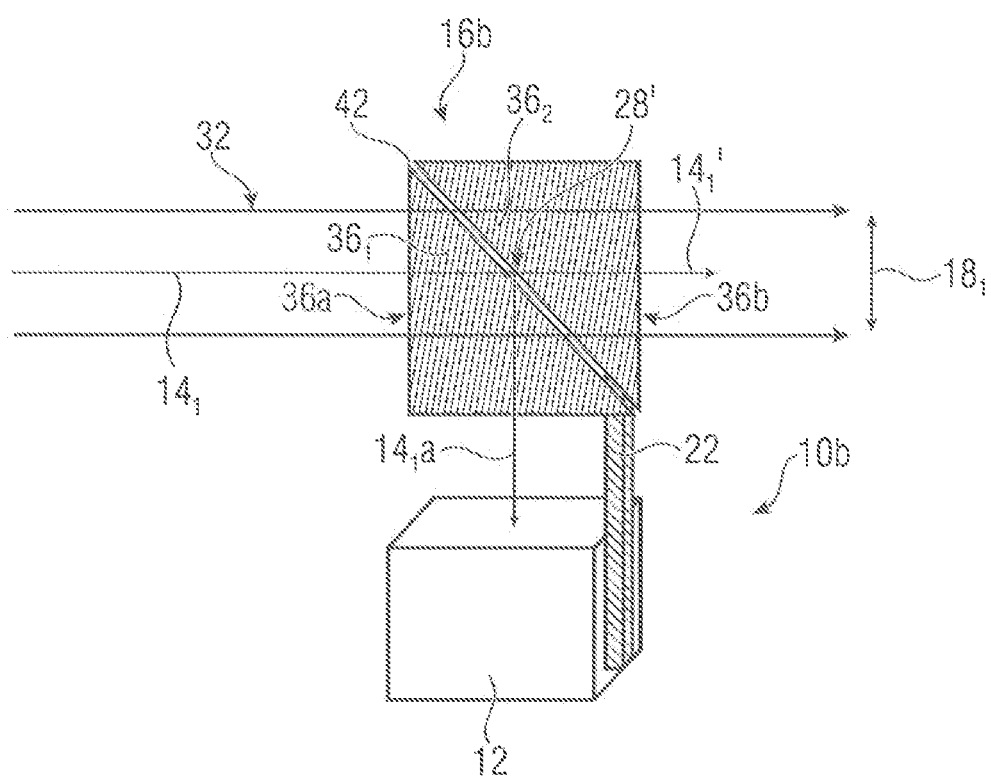

FIG. 3b shows a schematic perspective view of a participant apparatus 10b according to an embodiment, wherein the deflection means 16b is configured as a combination of two prisms $36_1$ and $36_2$. This allows entry and/or exit of the wireless optical signal or portions thereof at perpendicular areas such that an offset 28' along the direction $18_1$ can be reduced compared to the configuration in FIG. 3a, as the extent is merely influenced by a distance between facing interfaces of the prisms $36_1$ and $36_2$.

Both the participant apparatus 10a and the participant apparatus 10b is configured with the respective deflection means 16a or 16b to couple out a portion of the transmit signal $14_1$ or the portion remaining therefrom and to deflect the same in the direction of the communication means 12. A respective remaining part $14_1$' passes the deflection means.

Coupling out according to the deflection means 16a and 16b can be based, for example, on a polarization of the coupled-out part, for example, in that a perpendicularly polarized or transversely polarized or parallel polarized portion is coupled out and other portions pass the deflection means.

The reflectance of the deflection means 16b can also be influenced, for example, by the size of the gap 42 between the prisms $36_1$ and $36_2$ and via the material (air, transparent plastic, adhesive or the same).

Figure 3C:
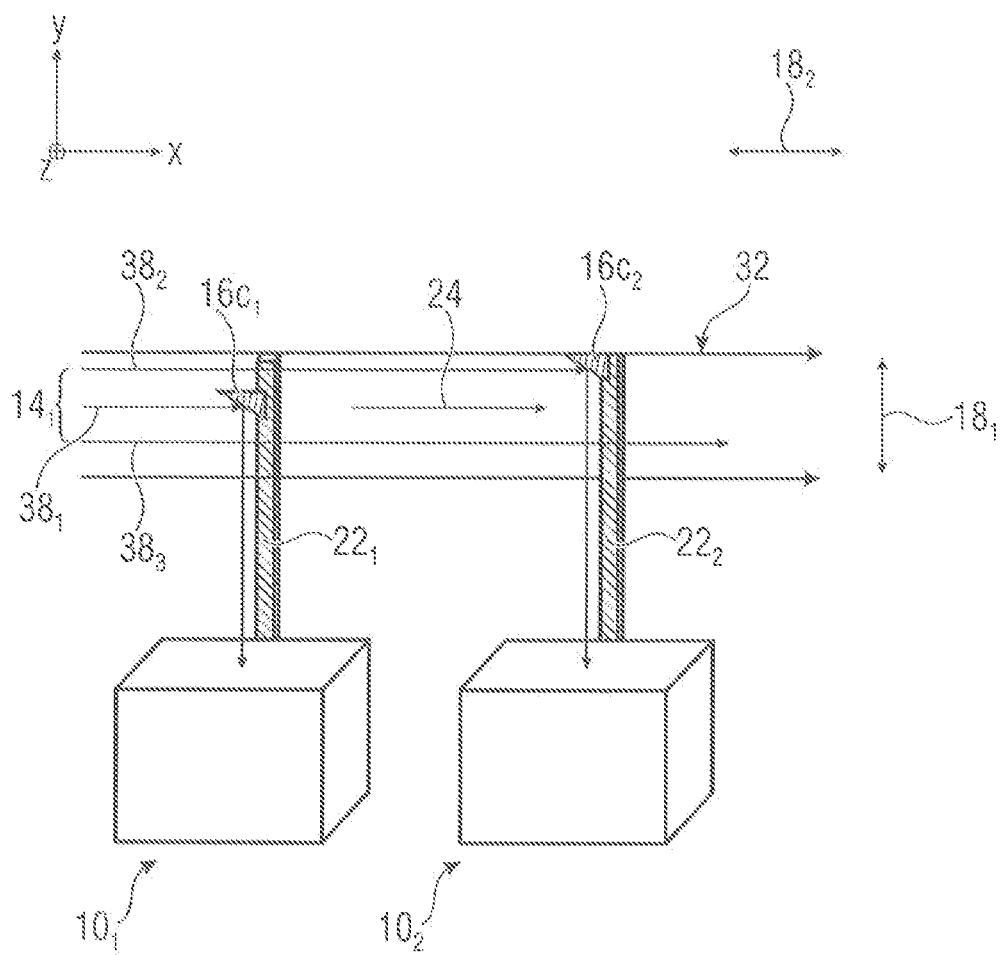

FIG. 3c shows a schematic perspective view of two participant apparatuses $10_1$ and $10_2$, each comprising reflective beam-deflecting means $16c_1$ or $16c_2$, for example, as deflecting mirrors. The same are formed such that the deflecting means $16c_1$ and $16c_2$ each couple out only an allocated spatial area $31_1$ or $38_2$ of the transmit signal $14_1$ along one or several directions perpendicular to a course of the communication channel 32, for example perpendicular to the direction $8_2$, i.e., approximately perpendicular to the direction $18_1$ or perpendicular thereto, while other spatial portions $38_2$ or $38_3$ can pass the deflecting means 16 to reach participant apparatuses behind the same.

Thus, the deflecting means 16c can be configured to couple out the respective part based on a spatial position of the deflecting means within a course of the wireless optical signal $14_1$ in parallel to the second direction, wherein the spatial positioning according to FIG. 3c can easily be combined with the configuration according to FIG. 3a and/or FIG. 3b to supply a large number of participant apparatuses with optical signals and/or to direct a high number of wireless optical data signals from a respective number of participant apparatuses to the base station.

The shown spatial multiple use, i.e., merely partly coupling out the optical signal along a direction perpendicular to the axis 24 can relate to one or several directions. If the axis 24 is considered, for example, as being parallel to an x-direction, partial coupling out can take place along the y-direction, with large or complete coupling-out along the y-direction arranged perpendicular thereto in the Cartesian coordinate system or vice versa. Alternatively, it is also possible to configure the spatial partial coupling-out such that only parts of the optical signal $14_1$ are coupled out both along the y-direction as well as along the z-direction such that several deflecting elements of different participant apparatuses can be arranged along both respective directions.

In other words, the physical principle of coupling out depends on the specific configuration of the beam splitter/deflection means. The following possible exemplarily realizations result, which are also illustrated in FIGS. 3a, 3b and 3c:

1. The beam splitter is a possibly simple disk rotated, for example, by 45° to the optical axis, as illustrated in FIGS. 2 and 3. The disk can consist of a material transparent with respect to the communication wavelength or can include the same. Here, the coupling-out can be based on Fresnel reflections at the front and rear $34_1$, $34_2$ of the disk. Exemplarily, this can relate to:
   Polarization of the light in the light beam: a p-polarized light is reflected to a different degree than a s-polarized light, for example;
   Refractive index of the beam splitter and the surrounding medium, such as air, vacuum, water or the same.
   The angle at which light impinges on the disk; an angle of >60° measured to the surface normally increases the Fresnel reflections
   A coating on the beam splitter, such as a reflective coating and/or an anti-reflective coating for a specific wavelength range on the front $34_1$ and/or the rear $34_2$.
2. Exemplarily, the beam splitter can have a cuboid shape, as illustrated in FIG. 3b, in that the same is composed of, for example, two prisms $36_1$ and $36_2$ exemplarily having a triangular base, which are connected via a connecting layer 42. The connecting layer 42 can include a transparent adhesive material/adhesive, but can also include another solid or fluidic material, such as air. Here, it is advantageous that the beam offset 28/28', which can result during each coupling out can be reduced with respect to the formation as disk according to FIG. 3*a*. However, the configuration of the beam splitter is here spatially larger.

The coupling-out ratio of the optical light power, i.e., the ratio between coupled-out portion 14$_1$*a* and transmitted part 14$_1$' can result from or can at least be based on the thickness and the material of the connecting layer 42 or the ratio of the refractive indices of prism material with respect to the connecting material, this means a material of the prisms 36 and the material of the connecting layer 42 established for connecting the prisms 36$_1$ and 36$_2$.

Alternatively and while considering the polarization, the beam splitter 16*b* can also be configured in the form of Glan-Tylor prisms or Glan-Foucault prisms.

3. The beam splitter can be configured as described in point 1 or 2, and can additionally be configured as a mirror, for example, a dichroic mirror, i.e., the same selectively couples out a wavelength or a wavelength range. Thus, it is possible that not all trolleys/participant apparatuses receive all data, but only those that are determined for the spatial trolley/trolleys.

4. The beam splitter can have a spatial effect, i.e. the same only has an effect on the case of the cross section of the beam as described in FIG. 3*c*. The same can be configured, for example, to be so small the same only has an effect on a small part of the beam cross section and couples out the same or part of the same. This beam splitter 16*c* of each participant apparatus/trolley couples out another part of the beam and lets the rest pass completely. The beam offset during coupling-out can thus be prevented. In such embodiments, it can be advantageous when the beam splitter has a high reflectance, but this is optional.

The beam splitter concepts can be combined and/or used in all embodiments described herein.

In other words, FIGS. 3*a* to 3*c* show implementation variations of the beam splitter.

The embodiments according to FIGS. 2, 3*a*, 3*b* and 3*c* describe a configuration of wireless optical communication systems such that the base station is established to transmit a wireless optical signal, which is transferred to one or several participant apparatuses. Alternatively or additionally, it is possible that one or several participant apparatuses of the wireless optical communication network are established to transfer a wireless optical signal to the base station. Here, the participant apparatuses of communication networks can be formed in the same way or differently, this means there is the option that some participant apparatuses are established for unidirectional communication operation, which can differ among the participant apparatuses, while other participant apparatuses are established for bidirectional communication operation.

Figure 4:
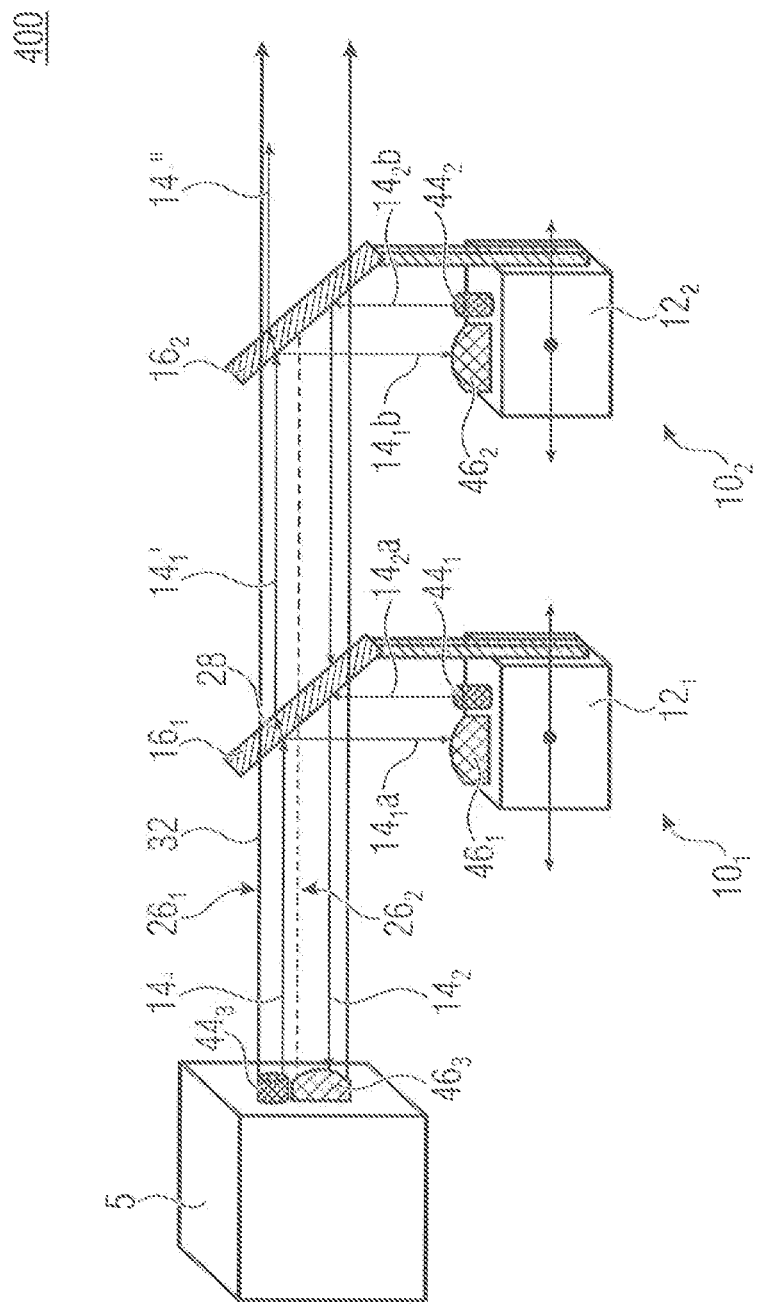
FIG. 4 is a schematic block diagram of a wireless optical communication network for bidirectional communication according to an embodiment.

FIG. 4 shows a schematic block diagram of a wireless optical communication network according to an embodiment, wherein a number of participant apparatuses 10$_1$ and 10$_2$ is arranged, wherein a number thereof can be arbitrary as described above. The participant apparatuses 10$_1$ and 10$_2$ are each established for bidirectional communication, this means the communication means 12$_1$ and 12$_2$ can each comprise a transmitting interface 44$_1$ or 44$_2$ for emitting wireless optical signals 14$_2$*a* or 14$_2$*b*. Additionally, the communication means 12$_1$ and 12$_2$ can comprise receiving means 46$_1$ or 46$_2$ for receiving the coupled-out portions 14$_1$*a* or 14$_1$*b*.

The communication means 12 can be established for full-duplex operation or half-duplex operation. While half-duplex operation can mean alternating transmitting and receiving, full-duplex operation can mean simultaneous transmitting and receiving of wireless optical signals from a communication means 12 to the base station 5 or from all communication means 12 simultaneously to the base station.

Corresponding to the participant apparatus 12$_1$ and 12$_2$, the base station 5 can comprise a transmitting interface 44$_3$ and a receiving interface 46$_3$ to transmit the wireless optical signal 14$_1$ in a beam 26$_1$ or to receive the wireless optical signal 14$_2$ in a beam 26$_2$, wherein the beams 26$_1$ and 26$_2$ can be spatially separated or overlapping.

Here, the wireless optical signal 14$_2$ can be an optical combination or overlap of the wireless optical signals 14$_2$*a* and 14$_2$*b* emitted by the participant apparatuses 10$_1$ and 10$_2$. Thus, the wireless optical communication network 14 can be configured such that the combined overlapping wireless optical signal 14$_2$ is no digital or electronic combination of the signals of the participant apparatuses 10$_1$ and 10$_2$, but an optical combination or overlap. Thus, each of the signals 14$_2$*a* and 14$_2$*b* can be part of the combined or overlapping receive signal 14$_2$ that is received by the base station 5. In that way, the combination can take place in the optical domain instead of the electrical domain. After receiver-side conversion of the signal into the electrical domain, the signal can at first also be present in a combined manner. Individual signals can be separated from one another by means of de-multiplexing at the base station.

For this, the same deflection means 16$_1$ and 16$_2$ can be used, which are also used for coupling-out parts 14$_1$*a* and 14$_1$*b*, which means the deflection means 16$_1$ and 16$_2$ can be used bidirectionally.

Optical paths of the signals 14$_1$ and 14$_2$ can be formed in the communication channel 32 spatially separated or spatially completely or partly overlapping.

Thus, it is intended that the participant apparatuses receive the wireless optical signals by means of the coupled-out portion from the base station, wherein part of the wireless optical signal is coupled out with the deflection means 16$_1$ or 16$_2$ and a respectively remaining part 14$_1$' or 14$_1$" passes the deflection means 16$_1$ or 16$_2$. In the transmitting case of the participant apparatuses, the participant apparatus 10$_2$ can emit the wireless optical partial signal 14$_2$*b* and direct the same with the deflection means 16$_2$ in the direction of the base station 5 such that the wireless optical partial signal 14$_2$*b* impinges on the deflection means of the participant apparatus 16$_1$ and passes the same in the direction of the base station. Depending on the synchronization between the participant apparatuses 10$_1$ and 10$_2$, the portion 14$_2$*a* can be optically combined with the portion 14$_2$*b* or can be transmitted at a different time.

Thus, embodiments relate to the fact that the participant apparatuses each emit partial signals 14$_2$*a* and 14$_2$*b* that are deflected with the deflection means 16$_1$ or 16$_2$ in the direction of the base station such that the optical partial signals 14$_2$*a* and 14$_2$*b* each form part of the combined wireless optical signal 14$_2$.

The different participant apparatuses 10$_1$ and 10$_2$ of the wireless optical communication network 400 or of a different wireless optical communication network described herein can each receive the same wireless optical signal 14$_1$ or transmit the same wireless optical signal 14$_2$, at least regarding the characteristics of the wireless optical signal $14_2$, individually, in groups or globally, i.e., for each participant apparatus. A differentiation between individual participant apparatuses or groups thereof can be made by allocating a wavelength of the wireless optical signal, a frequency in the base band, a polarization of the wireless optical signal or a combination thereof, which is clearly allocated to the participant apparatus or the group thereof.

In other words, both when using the wireless optical signal $14_1$ as well as when using the wireless optical signal $14_2$, several participants can share the respective beam, i.e., the optical power and/or at least in areas the spatial area or the spatial course.

In other words, FIG. 4 shows a beam splitter based Li-Fi system in a linear communication scenario (bidirectional) and represents exemplarily a beam from the base station to one of the trolleys via the coupled-out portion $14_1 a$. The continuing beam, the portion $14_1'$ indicates that the beam can propagate further along the communication channel 32. Additionally, a beam $14_2 a/14_2$ is illustrated for the inverse direction, i.e., trolley to base station. Thus, the described system can use the described optical channel also for the back channel to allow bidirectional data transmission. Both the base station and the trolleys can be configured in the following ways:

1. The base station consists of a transmitter and the trolley of a receiver;
2. The base station consists of a receiver and the trolleys of one transmitter each;
3. The base station and each trolley consist both of a transmitter as well as a receiver.
4. Combinations thereof.

Variations 1 and 2 can be used for unidirectional communication as described in FIG. 2. However, variation 3 performs bidirectional communication as described in FIG. 4. The transmitter 44 can include at least one emitter that is configured to emit the wireless optical signal and optionally includes optics for beamforming, for example a lens for collimation, a Köhler integrator or the same. The receiver 46 includes at least one detector for receiving the light signal and optionally at least one optics, for example a lens for focusing the light beam on the detector. In bidirectional operation, the communication channel 32 is composed of both communication directions. Both beams can be spatially overlapping. Bidirectional communication can take place in half or full duplex operation method. To allow full duplex operation, a multiple access mechanism can be implemented. Wireless optical communication can be realized by using at least one of a frequency-division multiple access (FDMA) in the base band and/or in the carrier spectrum, a time-division multiple access (TDMA), carrier sense multiple access (CSMA), code-division multiple access (CDMA), space-division multiple access (SDMA) or the same. Even in half duplex operation, such a multiple access mechanism can be implemented, for example to increase data security. For example, the beam splitters 16 of the trolleys can be configured as dichroic mirrors that only couple out or couple in a specific wavelength of the light.

Figure 5:
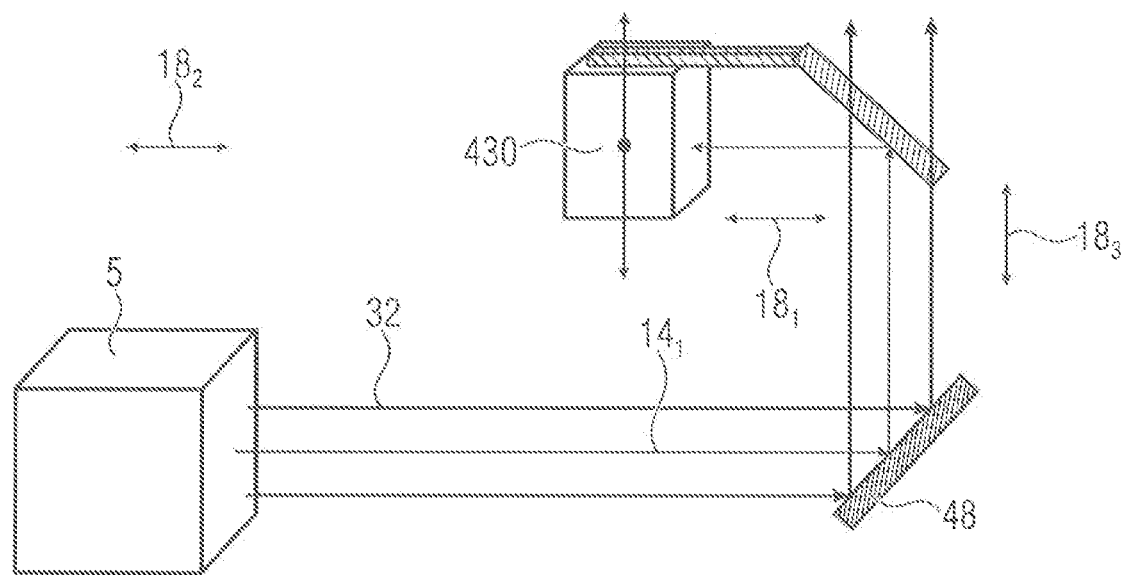
FIG. 5 is a schematic block diagram of a wireless optical communication network according to an embodiment where a beam-deflecting element is arranged to spatially deflect a communication channel.

FIG. 5 shows a schematic block diagram of a wireless optical communication network according to an embodiment, wherein a beam-guiding or beam-deflecting element 48 is arranged to spatially direct or deflect the communication channel 32. This allows any orientation of the direction $18_1$ in space, for example parallel to the direction $18_2$. The wireless optical communication network can comprise one or several optional beam-guiding elements 48 such that any non-straight course of the communication channel 32 can be established. The beam-guiding element 48 can include a reflector or mirror or can consist thereof. Alternatively or additionally, other beam-guiding elements can be arranged, such as optical fibers or optical waveguides that are arranged to couple in an optical signal on a first side to deflect the optical signal across the course of the optical fiber with respect to its direction and to output the same on the second side along the desired direction. By arranging one or several beam-guiding elements, a course of the communication channel 32 can be changed, which means, with reference to FIG. 1, that the direction $18_1$ is variable across its course.

The beam-guiding element can be spatially moved by an actuator and/or can be variable with respect to the beam-guiding characteristics, such as to change a direction of beam-guiding by means of a translational and/or rotational movement and/or to change a transmitted or filtered-out wavelength range or polarization or the same over time.

In other words, some embodiments provide for the communication channel extending along an axis simultaneously corresponding to a straight line in space, such as described in the context of FIG. 2. According to further embodiments, it is also possible that the communication channel comprises curves or bends, as illustrated in FIG. 5. Thereby, the wireless optical communication system can still be configured in a linear manner in that the participant apparatuses/trolleys only use a spatial degree of freedom, for example forward and backward on the axis of movement. The curvature/curve/bend of the communication channel 32 can be obtained by arranging one or several reflectors or optical fibers 48. For example, the wireless optical signal could be introduced into an optical fiber cable, be deflected and transferred again into a free medium. The communication capability of the participant apparatuses/trolleys could be given within the curve/curvature/bend, but the same is not needed, for example, in the case of an optical fiber. However, depending on the arrangement, the same can be implemented. FIG. 5 shows a realization of a curve by means of a mirror with the example of a 90° curve.

The above-described embodiments relate to a base station emitting the wireless optical signal $14_1$ along one direction and/or receiving the wireless optical signal $14_2$ from one direction.

Other embodiments provide for the base station operating in several directions, wherein this can be individually adjusted for the transmitting case and/or the receiving case.

Figure 6A:
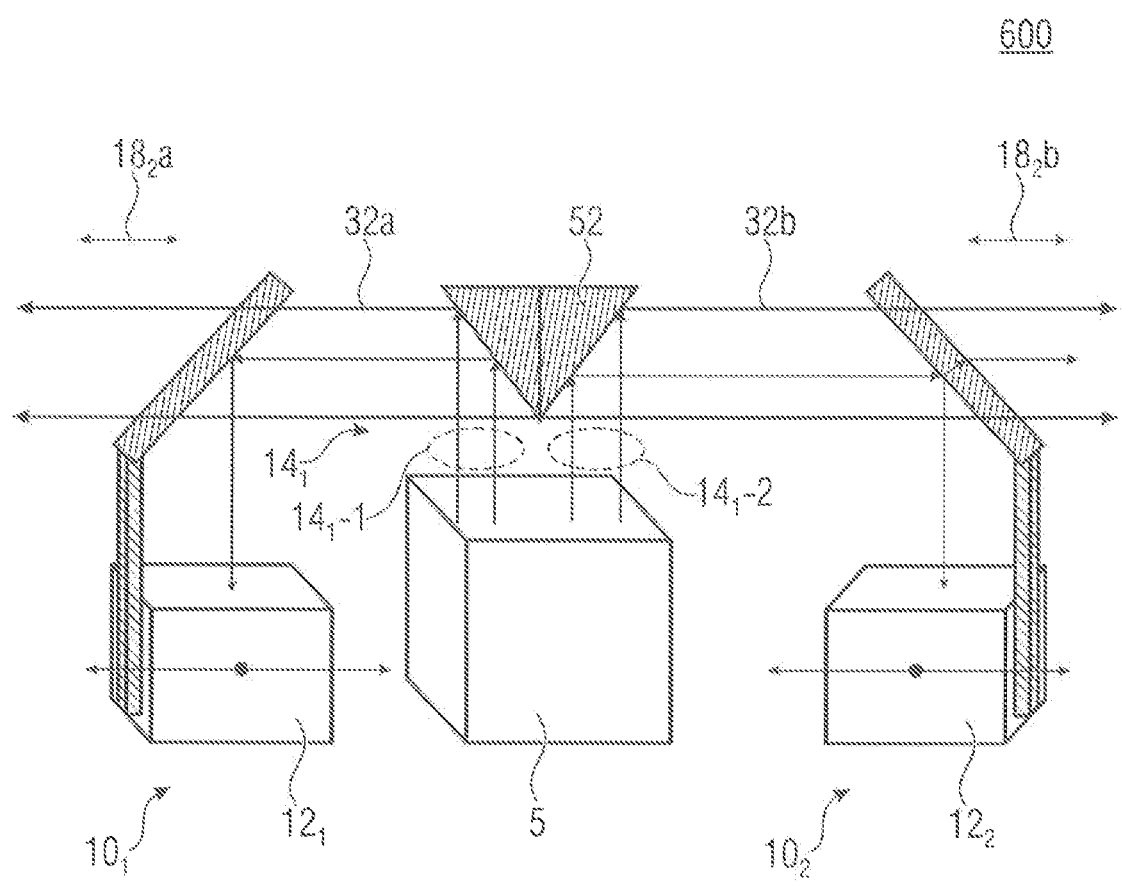
FIG. 6a is a schematic perspective illustration of a wireless optical communication network according to an embodiment, wherein a base station is configured to communicate along two directions.

FIG. 6a shows a schematic perspective illustration of a wireless optical communication network 600 according to an embodiment, wherein the base station 5 is configured to emit the wireless optical signal $14_1$, wherein the explanations also apply for the receiving case without any limitations. The participant apparatuses $10_1$ and $10_2$ are exemplarily arranged on different sides of the base station 5 and are arranged such that the communication means $12_1$ or $12_2$ are moveable with respect to the base station 5. With respect to the wireless optical signal $14_1$, a deflection element 52 is arranged, for example, as deflection mirror or prism structure, such that a first portion $14_1$-1 is deflected in a first direction and a second portion $14_1$-2 of the wireless optical signal $14_1$ is deflected in another different direction. The deflection element or beam-guiding element 52 can hence also be used for beam splitting. Exemplarily, the directions $18_2 a$ and $18_2 b$ obtained thereby are parallel to one another, such that communication channels 32a and 32b can also propagate parallel to one another but starting from the base station 5 in different directions, for example opposite to one another in space. Basically, any combination of directions is possible with the deflection element 52.

While the division of the wireless optical signal $14_1$ in two directions $18_2a$ and $18_2b$ is illustrated, a different number of directions can be obtained, for example a single one as illustrated in FIG. 5 or more than two, for example by arranging additional areas in the beam-guiding element or deflection element or means for beam splitting 52. The means for beam splitting 52 can be configured to obtain the wireless optical signal $14_1$-1 and the wireless optical signal $14_1$-2 by beam splitting from a common source signal emitted by the base station, and to deflect the obtained portions in different, e.g. opposite parallel directions. Alternatively or additionally, the base station 5 can include several wireless emitters that are configured to provide differing signals such that the wireless optical signal $14_1$-1 is generated by a first emitter and the wireless optical signal $14_1$-2 is generated by a different emitter.

If the wireless optical signal $14_1$ is provided, for example, by a single emitter, both portions $14_1$-1 and $14_1$-2 can have the same information content and can hence be considered as same or identical parts of the signal, which is divided along the directions $18_2a$ and $18_2b$, such that the wireless optical signal $(14_1$-1$)$ and the wireless optical signal $(14_1$-2$)$ are the same, for example.

However, it is also possible to provide two or several emitters, such that the portions $14_1$-1 and $14_1$-2 are generated with different information, light powers, wavelength or other signal characteristics, such that the wireless optical signals propagating in the communication channels $32a$ and $32b$ differ from one another with respect to at least one signal characteristic.

The shown configuration, two-way communication with respect to the base station, allows a further degree of freedom in supplying participant apparatuses with wireless optical signals. Alternatively or additionally, in contrast to a one-sided arrangement, where the base station is arranged on one end of the communication channel and the participant apparatuses are arranged along one side or direction starting therefrom, a simple or error tolerant configuration of the wireless optical communication network can be obtained. A same length of the overall communication channel, for example 100 m, wherein any other value can be implemented, makes certain demands on the one-sided arrangement regarding precision of the adjustment and/or the optics to use the wireless optical signal. These demands can be loosened by dividing the communication channel in two subsections, for example a symmetrical separation of 50%/50%, i.e., half by half, approximately 2×50 m, but also with asymmetrical division, such as 90%/10%, 70%/30%, 60%/40% or in between. The respective subchannel is respectively shorter, such that effects like divergence might have less impact.

Figure 6B:
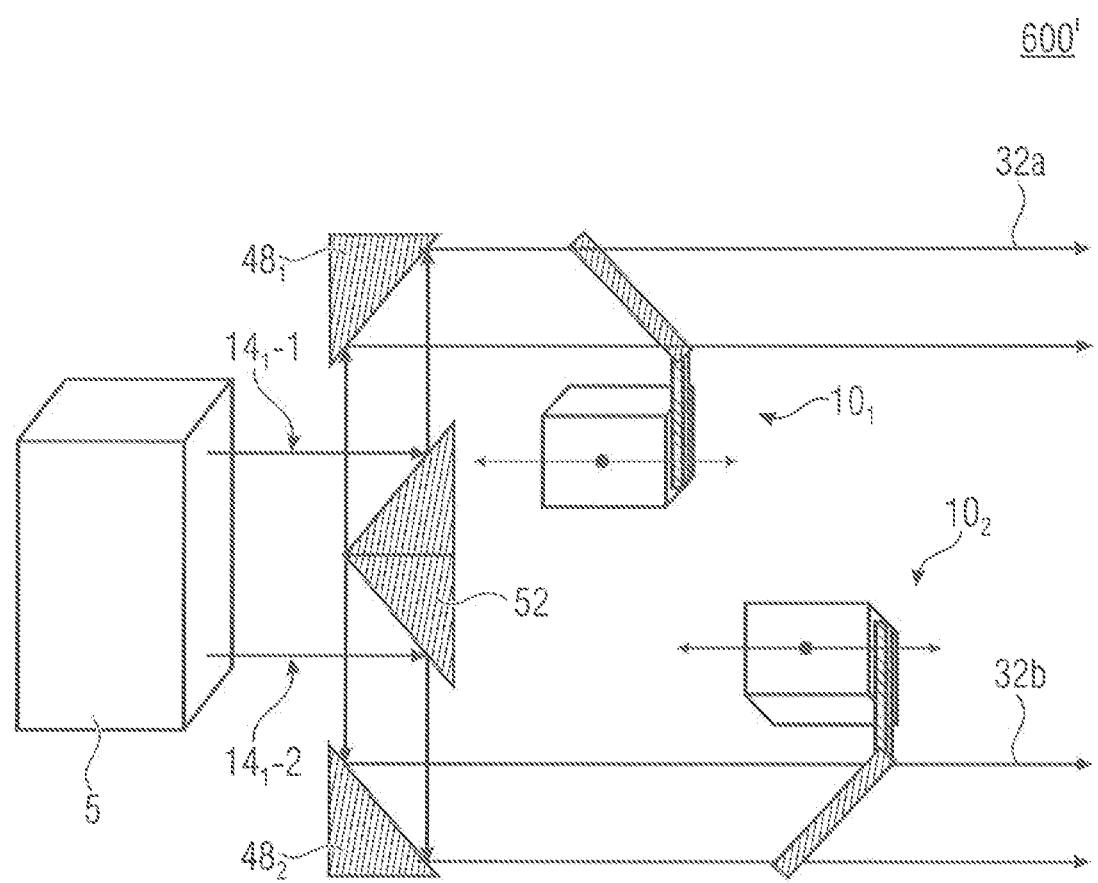
FIG. 6b is a schematic perspective view of a wireless optical communication network according to a further embodiment, wherein the communication channels, with respect to FIG. 6a, are deflected additionally by arbitrarily adjustable and optional beam-deflecting elements.

FIG. 6b shows a schematic perspective view of a wireless optical communication network 600' according to a further embodiment, wherein the communication channels $32a$ and $32b$ are additionally deflected, compared to FIG. 6a, by arbitrarily adjustable and optional beam-deflecting elements $48_1$ and $48_2$. Basically, any spatial directions of the communication channel(s) can be adjusted. In the further course, the communication channels $32a$ and/or $32b$ can also be deflected again.

The deflection element 52 and/or the beam-deflecting elements $48_1$ and/or $48_2$ can also be part of the base station 5.

Figure 6C:
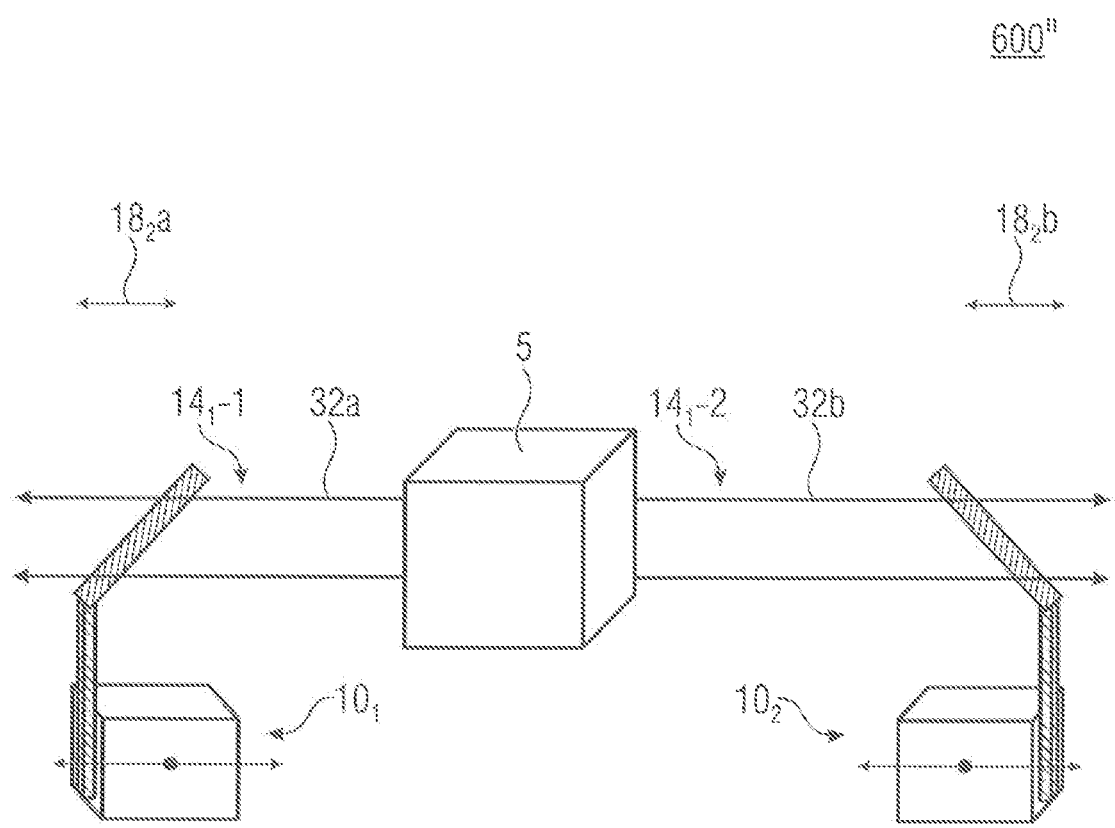
FIG. 6c is a schematic perspective view of a wireless optical communication system, wherein the base station is configured to emit different or equal wireless optical signals in different directions.

FIG. 6c shows a schematic perspective view of a wireless optical communication system 600'', wherein the base station 5 is configured to emit parts $14_1$-1 and $14_1$-2 along different directions $18_2a$ and $18_2b$. This can be obtained, for example, by integrating the deflection element 52 of FIG. 6a in a housing of the base station 5 and/or by usage of two individual optical emitters or signal sources. Here, also a different, in particular, higher number of emitters can be provided to obtain a higher number of directions.

In other words, embodiments relate to multiple configurations. It is possible to form several communication channels or a base station with several transmitters and/or receivers, as illustrated in FIGS. 6a, 6b and 6c, by possibly stationary beam splitters 48 and/or 52. The reflective area of the beam splitters can be planar, but can also have a curvature, for example to operate as Köhler integrator. In that way, placement tolerances can be compensated or the beam can be formed or deflected. If the base station has several transmitters and/or receivers as exemplarily shown in FIGS. 6a, 6b and 6c, the same can form several communication channels in any spatial directions. The participant apparatuses/trolleys can move along the same and at the same time maintain wireless optical communication. The stationary beam splitters of FIG. 6b can be used to allow the communication from a base station with trolleys to different linear communication channels. A base station having several transmitters and/or receives according to FIG. 6c allows the formation of several linear communication channels on which different trolleys move.

A signal source of wireless optical communication networks described herein can be configured to emit any light power. For example, signal sources in the participant apparatuses and/or the base station are configured such that an optical signal power of at least 1 mW and at most 100 W, at least 50 mW and at most 1 W or at least 90 mW and at most 400 W, approximately 100 mW, is provided to a receiver of the wireless optical signal. This means a loss of optical power is considered across the communication channel to provide the stated optical powers to the receiver to provide a high receiving quality.

The wireless optical communication networks described herein can map any scenarios. Particularly suitable are industrial scenarios where raw environmental conditions can prevail. Some of the wireless optical communication networks described herein are described in the context of participant apparatuses established as trolleys. Such wireless optical communication networks can comprise, for example, a rail area, for example in a traverse, a crane or other systems where one or several elements move to and fro.

Further, embodiments relate to a participant apparatus, such as the participant apparatus 10. The same comprises communication means for transferring a wireless optical signal between the participant apparatus and the communication partner. Here, the transfer relates to transmitting and/or receiving the wireless optical signal or different wireless optical signals. Further, the apparatus comprises a deflection means that is configured to deflect at least part of the wireless optical signal with respect to a direction between the deflection means and the communication means. While in the receiving case coupling out of merely a part can be provided, in the transmitting case, it can be possible or even advantageous to deflect the entire wireless optical signal provided by the communication means in the direction of the communication partner. Here, the deflection means can be stationary with respect to the communication means.

Deflection towards a direction or communication partner can take place while considering possible further beam-deflecting or reflecting elements. Thus, for example, FIG. 6b can also be understood such that an optical path is directed from a participant apparatus in the direction of the base station as long as the participant apparatuses $10_1$ and/or $10_2$ are established for transmitting wireless optical signals.

Embodiments described herein relate to a communication solution for a possibly linear communication scenario that uses optical wireless communication (OWC or light fidelity, Li-Fi). In contrary to optical fiber communication, no optical fiber is used, even when embodiments can use the same for deflecting the communication channel. A spatially well-defined communication channel is formed by a medium, such as air, water or the same such that different systems at the same location do not interfere with each other, since their channels do not overlap, i.e., the same can be separated spatially and/or in frequency and/or code or the same. Obtainable data rates can range from a few bit/s up to several 10 Gbit/s or more. One advantage in this concept is the fact that multipath propagation can essentially be prevented by well defined beam guidance that can be obtained by respective configuration of the transmitters. If the base station has, for example, several transmitters distributed along the linear axis, the same can be synchronized which, however, would result in a reduction of the maximum data rate. This problem can be prevented with the embodiments described herein by preventing multipath propagation. Compared to data light barriers, embodiments do not only allow the communication between two participants but the communication between a base station to basically any number of mobile participants, which are also referred to as trolleys herein.

Here, other than described in EP 2 903 407 A1 or US 2013/094927 A, embodiments can be configured without so-called daisy chain configuration which is based on receiving a signal, optionally evaluate the same and generate the same again for further participants. Embodiments allow the reception of the same wireless optical signal by the usage of beam splitters or deflection elements. Other than in apparatuses described, for example, in DE 10 2007 041 927 A1 or DE 28 46 526 A1, the wireless optical signal is here transmitted via a free medium, such as air, water or vacuum.

Although some aspects have been described in the context of an apparatus, it is obvious that these aspects also represent a description of the corresponding method, such that a block or device of an apparatus also corresponds to a respective method step or a feature of a method step. Analogously, aspects described in the context of a method step also represent a description of a corresponding block or detail or feature of a corresponding apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A wireless optical communication network, comprising:
   a base station established for wireless optical communication using a wireless optical signal;
   a participant apparatus moveable with respect to the base station comprising a communication unit established for wireless optical communication, further comprising a deflection unit configured to deflect at least part of the wireless optical signal from a first direction to a second direction, wherein the first direction is a linear direction between the deflection unit and the communication unit and the second direction is a linear direction between the deflection unit and the base station;
   wherein the second direction runs along an axis of a communication channel, the deflection unit is arranged along the axis and the communication unit is arranged off-axis;
   wherein the wireless optical communication network is configured for bidirectional wireless optical communication between the base station and the participant apparatus;
   wherein the bidirectional wireless optical communication is configured as half duplex or full duplex.

2. The wireless optical communication network according to claim 1, wherein the communication unit is configured for transmitting and/or receiving wireless optical signals.

3. The wireless optical communication network according to claim 1, wherein the base station is configured to emit or receive the wireless optical signal in a first beam and in a second beam running spatially separated from the first beam.

4. The wireless optical communication network according to claim 1, wherein the wireless optical signal is a first wireless optical signal; and wherein the base station is configured
   to transmit or to receive the first wireless signal and a second wireless optical signal in different spatially separated beams.

5. The wireless optical communication network according to claim 4, wherein the first wireless optical signal and the second wireless optical signal are the same.

6. The wireless optical communication network according to claim 4, wherein the first wireless optical signal and the second wireless optical signal differ from one another regarding at least one signal characteristic.

7. The wireless optical communication network according to claim 5, comprising a beam splitting unit configured to acquire the first wireless optical signal and the second wireless optical signal by beam splitting from a common source signal; and/or
   wherein the base station comprises a first wireless optical emitter configured to generate the first wireless optical signal; and comprises a second wireless optical emitter configured to generate the second wireless optical signal.

8. The wireless optical communication network according to claim 1, wherein the deflection unit of the participant apparatus is stationary with respect to the communication unit, wherein the wireless optical signal defines a communication channel along which the participant apparatus is movable.

9. The wireless optical communication network according to claim 1, wherein the communication unit is moveable along a deflection direction acting from the deflection unit on the optical signal with respect to the deflection unit.

10. The wireless optical communication network according to claim 1, comprising a plurality of participant apparatuses, wherein the participant apparatus belongs to the plurality of participant apparatuses and the plurality of participant apparatuses are connected in series with respect to the optical signal.

11. The wireless optical communication network according to claim 1, comprising a plurality of participant apparatuses, wherein the participant apparatus belongs to the plurality of participant apparatuses;
   wherein the base station is configured to emit the optical signal as transmit signal and each of the plurality of participant apparatuses is configured to receive at least part of the transmit signal emitted by the base station.

12. The wireless optical communication network according to claim 1, comprising a plurality of participant apparatuses, wherein the participant apparatus belongs to the plurality of participant apparatuses;
wherein the base station is configured to receive the optical signal as receive signal and each of the plurality of participant apparatuses is configured to emit part of the signal received by the base station such that the receive signal is an optical combination of the emitted parts.

13. The wireless optical communication network according to claim 1, wherein the participant apparatus is a first participant apparatus, wherein the wireless optical communication network comprises at least one second participant apparatus;
wherein the first participant apparatus is configured to receive the wireless optical signal from the base station to couple out a first part thereof with the deflection unit and to let a remaining second part pass; wherein the second participant apparatus is configured to couple out at least part of the second part with the deflection unit; and/or
wherein the second participant apparatus is configured to emit a wireless optical partial signal and to deflect the same with the deflection unit in the direction of the base station such that the wireless optical partial signal impinges on the deflection unit of the first participant apparatus and passes through the same in the direction of the base station.

14. The wireless optical communication network according to claim 13, wherein the second participant apparatus is configured to emit the wireless optical partial signal as second wireless optical partial signal and wherein the first participant apparatus is configured to emit a first wireless optical partial signal and to deflect the same with the deflection unit in the direction of the base station such that the first optical partial signal and the second optical partial signal each form part of the wireless optical signal.

15. The wireless optical communication network according to claim 1, wherein the base station is configured to emit at least temporarily a wireless optical transmit signal;
wherein the deflection unit is configured to couple out a first part of the transmit signal and to deflect the same in the direction of the communication unit and to let a second part of the transmit signal pass.

16. The wireless optical communication network according to claim 15, wherein the deflection unit is configured to couple out the first part based on at least one of:
a polarization of the first part;
a wavelength range of the first part; and
a spatial position of the deflection unit within a course of the wireless optical signal parallel to the second direction.

17. The wireless optical communication network according to claim 15, wherein the deflection unit comprises a beam splitter configured to deflect the first part and to be transparent for the second part.

18. The wireless optical communication network according to claim 17, wherein the beam splitter comprises a beam splitter plate element with a first main side and a second opposite main side, wherein at least one of the first and second main sides is configured to generate beam splitting by a Fresnel reflection.

19. The wireless optical communication network according to claim 18, wherein the main side established for Fresnel reflection comprises a reflective coating or an anti-reflective coating.

20. The wireless optical communication network according to claim 17, wherein the beam splitter is a combination of at least one of a first and second prism forming at least one interface in a contact region; wherein the interface is configured to couple out the first part.

21. The wireless optical communication network according to claim 1, wherein the participant apparatus is a first participant apparatus, wherein the wireless optical communication network comprises at least one second participant apparatus; wherein a wavelength of the optical signal, a frequency in the baseband, a polarization of the optical signal or a combination thereof is clearly allocated to each of the participant apparatuses.

22. The wireless optical communication network according to claim 1, configured to provide the wireless optical communication with at least one of
frequency-division multiple access;
time-division multiple access;
carrier sense multiple access;
code-division multiple access; and
space-division multiple access;
between the base station and the participant apparatus.

23. The wireless optical communication network according to claim 1, wherein the base station is stationary.

24. The wireless optical communication network according to claim 1, wherein the deflection unit is configured to couple out a portion of at least 0.1% and at most 20% of a light power of a wireless optical signal received by the base station.

25. The wireless optical communication network according to claim 1, which is configured to provide a signal power of the wireless optical signal of at least 1 mW and at most 100 W to a receiver of the wireless optical signal.

26. The wireless optical communication network according to claim 1, comprising a rail area on which the participant apparatus is movably arranged as a trolley.

* * * * *